United States Patent [19]

Smahlik et al.

[11] Patent Number: 4,856,929
[45] Date of Patent: Aug. 15, 1989

[54] INTERIOR CLAMPING DEVICE FOR TUBULAR POLES

[75] Inventors: Alois J. Smahlik, Valley Springs; Michael A. Smahlik, Oakland; Richard D. Phipps, Morgan Hill, all of Calif.

[73] Assignee: Steccone Products Co., Oakland, Calif.

[21] Appl. No.: 111,203

[22] Filed: Oct. 21, 1987

[51] Int. Cl.$^4$ ............................................. F16B 7/00
[52] U.S. Cl. .................................. 403/297; 248/161; 248/411
[58] Field of Search ...................... 403/297, 292, 280; 248/412, 411, 161

[56] References Cited

U.S. PATENT DOCUMENTS

| | | | |
|---|---|---|---|
| 953,896 | 4/1910 | Clattenburg | 403/343 X |
| 2,282,285 | 5/1942 | Olson | 248/168 |
| 3,004,743 | 10/1961 | Wenger | 248/161 |
| 3,041,695 | 7/1962 | Ouellette | 24/126 |
| 3,144,736 | 8/1964 | Rusk et al. | |
| 3,227,113 | 1/1966 | Kupski | 248/161 X |
| 3,431,576 | 3/1969 | Moss et al. | 15/229 |
| 3,508,773 | 4/1970 | Coberly et al. | |
| 4,022,287 | 5/1977 | Lundstrom et al. | |
| 4,294,560 | 10/1981 | Larkin | 248/411 X |
| 4,371,282 | 2/1983 | Sturm | 403/277 |
| 4,431,096 | 2/1984 | Kloster | 403/342 X |

FOREIGN PATENT DOCUMENTS

| | | | |
|---|---|---|---|
| 528038 | 4/1954 | Belgium | 248/412 |
| 672542 | 10/1963 | Canada | 248/412 |
| 192023 | 2/1964 | Sweden | 248/189.36 |

Primary Examiner—James T. McCall
Attorney, Agent, or Firm—Kathleen A. Skinner

[57] ABSTRACT

An interior clamping device for tubular poles which includes a driver disposed in one tubular member with a tapered end portion projecting outwardly from the tubular member. An expandable sleeve is disposed in a second tubular member. Locking means removably secure the driver to the sleeve by a fastener so that when the driver is rotated in one direction the expandable sleeve is moved radially outwardly against the inner surface of the tube to lock the tubes together.

17 Claims, 3 Drawing Sheets

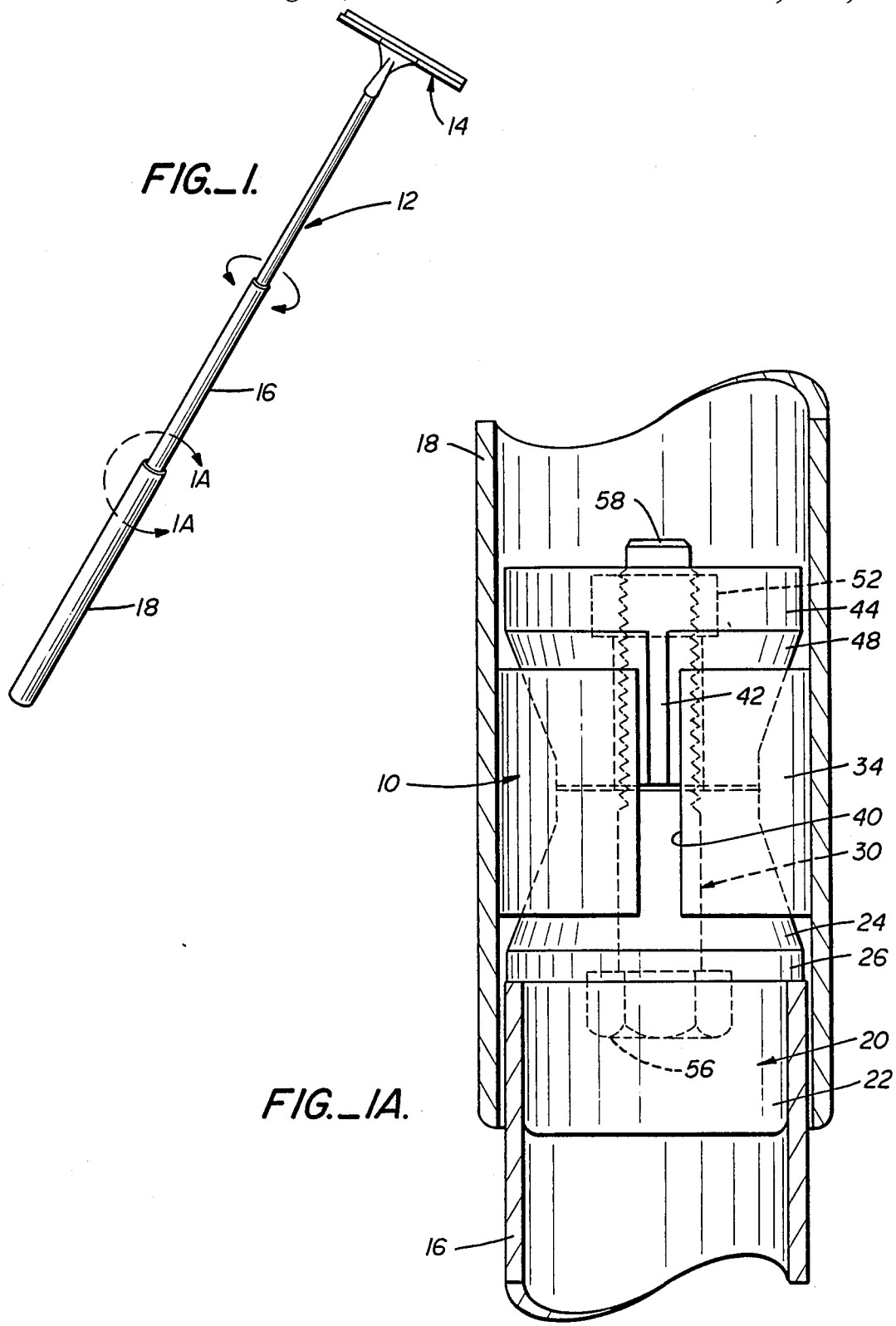

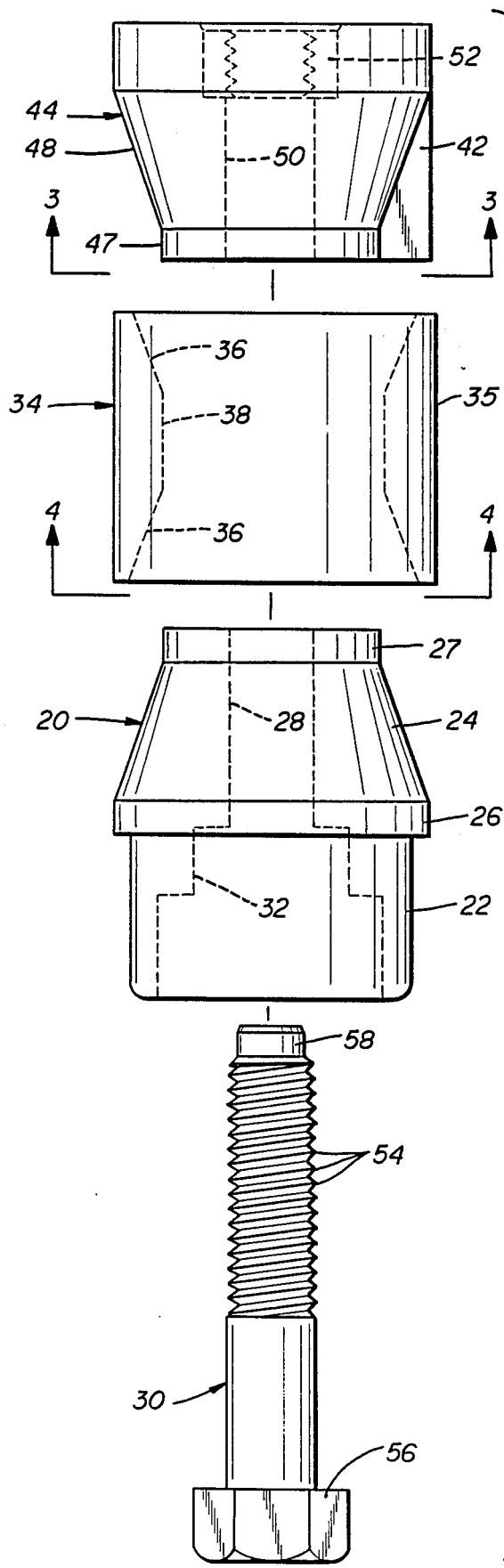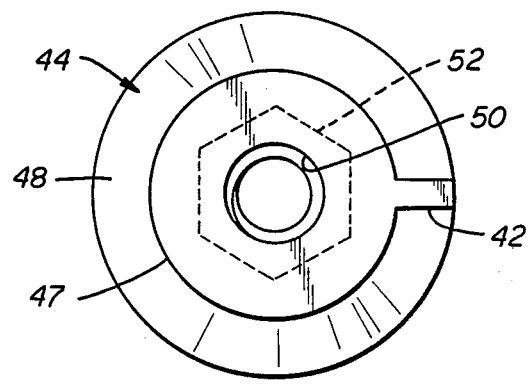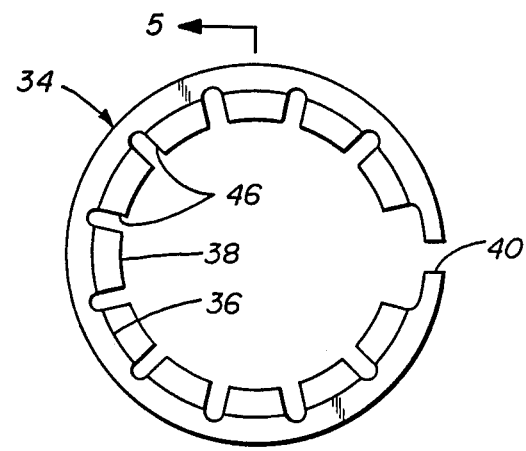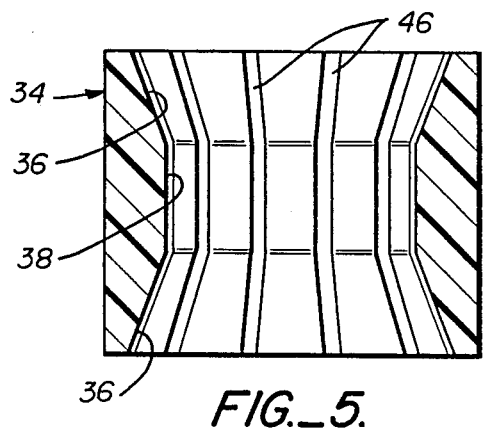

U.S. Patent Aug. 15, 1989 Sheet 3 of 3 4,856,929
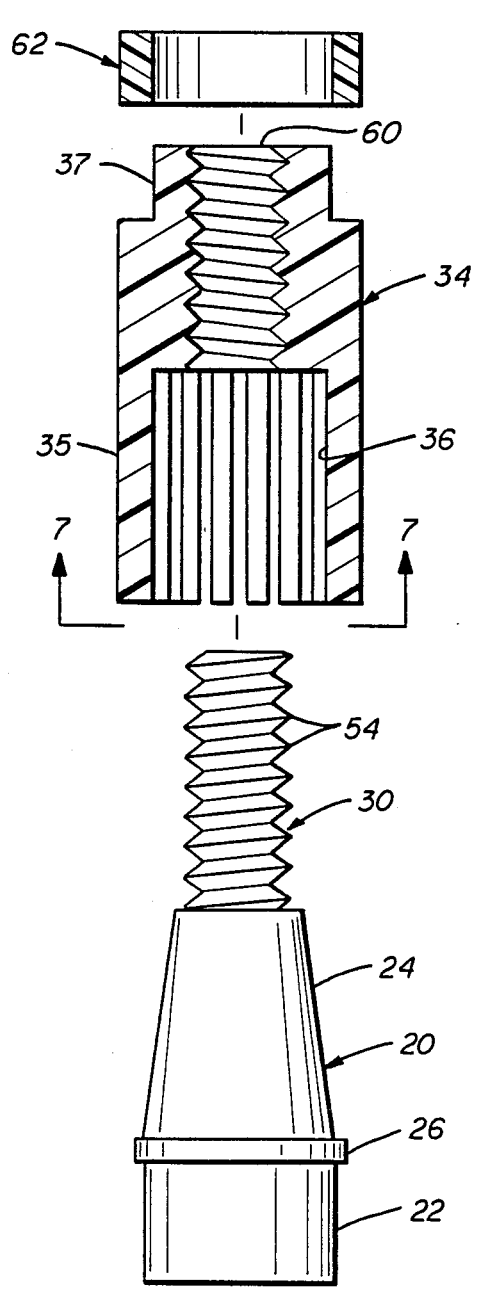
FIG._6.
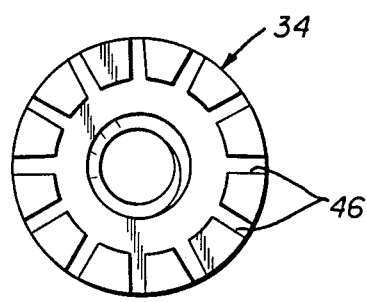
FIG._7.

INTERIOR CLAMPING DEVICE FOR TUBULAR POLES

BACKGROUND OF THE INVENTION

1. Field of the Invention

The present invention relates to devices for clamping tubular members together and particularly, to interior clamps for locking the extended sections of telescoping extension poles in place.

2. Description of the Prior Art

Extension poles are used in a number of fields, for example, in connection with washing windows, where the reach of the operator needs to be extended in a safe manner. Window washers employ squeegees and other cleaning utensils to clean windows precisely, sometimes at considerable heights, and occasionally they need to use extension poles of varying lengths to extend their reach without changing the operator's position. For that purpose window washers have used telescopic extension poles, which are a series of concentric tubes of increasing diameter stored within each other so that as additional length is needed, a tube with a smaller inner diameter is pulled out and extended to the desired length.

Various devices have been used to lock the sections of the extension pole at their desired position. One clamping method which has been used to join the sections of the extended pole is a cone clamp. This device can be used to obtain a solid, securely locked telescopic joint. It includes a sleeve with longitudinally projecting ridges and radial threads which is permanently mounted on the exterior of a larger diameter pole; the inner pole is extended out and a cone is tightened over the sleeve. Internal threads on the cone engage with matching threads on the sleeve and as they are screwed together, the clamp tightens on the pole and holds the joint in place. Although it provides a secure locking mechanism, this form of clamp requires projections which are permanently anchored to the tube and a conical attachment along the exterior surface of the tubes at their joint. As the extension pole is pulled through the user's hand during use, these projections at the joint can irritate the hand.

To avoid such irritation, many window washers and other persons prefer to use extension poles with an interior clamping device because it allows the poles to have a smooth surface on the exterior joint during use, as well as when it is in a telescoped or collapsed position. Various types of internal clamps, with all the parts located on the interior of the poles, have been developed. In one type, a projecting cylindrical plug with eccentric stops is mounted in the end of one tube. Slotted rings having indentations to match the stops are fastened onto the plug. When the tube is rotated the rings move slightly off-center and jam against the interior of the other tube. In another variation, the projecting plug has an eccentric indentation with a stop and a slightly oval ring of uneven width to fit over the eccentric section; rotation of the pole causes the oval ring to move off-center and fill the space in the pole. Another version of inner clamp utilizes an oval-shaped plug placed inside a circular plug in the pole; as the pole is rotated, one plug distorts the other and puts pressure against the inner wall of the tube. While all these centric-type clamps do create a smooth exterior surface of the poles, there are various disadvantages to their use. Generally, the eccentric plugs cannot be rotated through more than one rotation of the pole, which thus limits the amount of pressure which can be applied and the control the user has over the locking joint. Since many of these clamps do not provide a tight lock to start with, the eccentric member can usually be dislodged quite easily during the use of the pole as it is subjected to various motions by the window washer and the poles can unintentionally be knocked loose. In addition, the parts of the eccentric clamps inside the telescoping poles have a tendency to break easily and they are then difficult to retrieve for repair.

Accordingly, there has been a need, particularly for window washers and others who operate tools which require an extended reach, to have a telescoping extension pole which can be easily operated to provide a secure controlled lock between the axial extensions of the poles, but yet will also provide a clean, smooth outer surface for engagement with the hands when pulling the pole through the user's hand or when releasing it for a new extension. The present invention provides an interior clamping device which overcomes the problems with the prior art telescoping extension poles. An additional advantage of this invention is that it can be used in other applications where tubular members need to be put together temporarily but securely and where it is desirable to have a smooth exterior surface on the poles, such as the tubular frames used in show displays, or in assembling tripods or in anchoring the squeegee to the extension pole itself. Thus the present invention provides a unique solution to the problems of the prior art of telescopic extension poles and is an invention which can be used advantageously with other applications.

SUMMARY OF THE INVENTION

The present invention is an interior clamping device for securing round tubular members together so that they will have a smooth exterior surface at their joint. This clamping device has a driver disposed in one of the tubular members which has a tapered portion at its outer end. The driver fits into a matching recess in an expandable sleeve disposed inside a second tubular member. A locking member is disposed proximate the expandable sleeve and is secured to the driver by fastening means whereby when the driver is rotated the expandable sleeve is moved radially outwardly to lock against the inner surface of the tube surrounding it.

OBJECTS OF THE INVENTION

It is therefore an important object of the present invention to provide an interior clamping device for securing round tubular members, and particularly telescopic extension pole members, together so that they have a smooth outer surface.

It is a further object of the present invention to provide an interior clamping device which allows gradual and controlled activation of the locking mechanism and which can be tightened in only one direction.

It is still another object of the invention to provide a design for an interior clamping device which allows the various parts to be made from a variety of materials and manufacturing methods.

DESCRIPTION OF THE DRAWINGS

FIG. 1 is a perspective view of an extension pole employing the interior clamping device of this invention.

FIG. 1A is a front elevational view of the interior clamping device with the pole walls shown in cross-section and broken away.

FIG. 2 is an exploded side elevational view of one embodiment of the clamping device of this invention.

FIG. 3 is a plan view of the locking member of this embodiment taken along line 3—3 of FIG. 2.

FIG. 4 is a plan view of the expandable sleeve of this embodiment taken along line 4—4 of FIG. 2.

FIG. 5 is a cross-sectional view of the sleeve taken along line 5—5 of FIG. 4.

FIG. 6 is an exploded side elevational view of another embodiment of this invention, shown partially in cross-section.

FIG. 7 is a plan view of the sleeve of this embodiment taken along line 7—7 of FIG. 6.

DESCRIPTION OF THE PREFERRED EMBODIMENT

The present invention is an interior clamping device 10 for internally securing round tubular members together. This interior clamping device is particularly useful with a telescopic extension pole 12 upon which a squeegee 14 or other implement can be mounted to extend the reach of the window cleaner or other operator. Telescopic extension poles have a series of concentric sections which are stored one inside another until needed and then can be slid apart and secured at their joints to extend the reach of the pole. In FIG. 1A, an inner tube 16 is shown in a slidable relationship with an outer tube 18.

The interior clamping device 10 includes a driver 20 which is adapted to be disposed in one of said tubular members 16, which in this illustration is the tube with a smaller inner diameter. The upper (or inner) portion 22 which is mounted inside the tubular member has a generally cylindrical exterior surface and is sized to fit tightly within the interior of the inner pole. The driver also has a tapered portion 24 proximate one of its ends. This tapered portion, which is preferably frustoconical, projects outwardly from the tubular member in which the driver is mounted. The driver may also have an annular flange 26 between the upper portion 22 of the driver and its tapered portion 24. This flange acts as a stop to restrain the driver from slipping out of reach into the tube and also to align it a preferred distance from the other elements of the invention.

A fastener 30 projects through the expandable sleeve 34 (described hereafter) and is connected to the driver 20. The fastening member, a portion of which has external threads 54, can be an integral part of the driver or it can be a separate fastener. The threaded portion of the fastening member can project away from the driver or it can be received by and secured to said driver. In a preferred embodiment the driver 20 has a longitudinal bore 28 or passageway for supporting a fastener 30 disposed therethrough. The bore 28 will be shaped to accommodate the fastener; where the fastener is a bolt the bore can be widened at its outer end to create a stepped opening 32 which anchors the head 56 of the bolt in a recess and allows the use of a bolt having a standard head and length. In this embodiment, a nut 52 or other threaded securement member could alternatively be placed in opening 32 to capture the threaded end of the bolt 58 in the bore 28 of the driver.

An expandable sleeve 34, or clamping member, is disposed inside the second tubular member 18 which as shown in FIG. 1A is a tube with a larger inner diameter than the first tube 16. In one embodiment of the invention the sleeve 34 is substantially hollow with a generally cylindrical external surface 35 which, in a non-tightened state, frictionally engages the interior surface of the tubular member. This expandable sleeve has a recess 36 for engaging the tapered portion 24 of the driver. The recess 36 has an internally tapered surface which is preferably frustoconical and in the preferred embodiment the interior cavity of the sleeve has frustoconical openings on each end thereof, which are separated by a cylindrical portion 38 of the sleeve wall having a smaller inner diameter.

In this embodiment of the invention the expandable sleeve 34 has a longitudinal slot 40 which can extend the entire length of the sleeve. The slot widens and the sleeve expands as the driver 20 is moved toward the interior of the sleeve. The slot also acts to capture a stop 42 on the locking member 44 described below.

The expandable sleeve 34 preferably has a number of regularly spaced longitudinal grooves 46 located on its interior surface. The depth and number of these grooves allow the tension of the sleeve on the driver and on the interior surface of the tubular member to be preadjusted to avoid overtightening the clamp. The need for the grooves varies with the rigidity of the material from which the parts of the clamping device are made. Where flexible rubber parts are used, no grooves may be necessary. For a relatively rigid plastic sleeve, it is desirable to use a number of grooves spaced at regular intervals on the interior of the sleeve; they should be fairly deep relative to the thickness of the sleeve wall measured at its thickest point.

Locking means is disposed proximate the expandable sleeve 34 to removably secure the driver 20 in the sleeve 34. In one embodiment of the invention, a locking member 44 is disposed in the expandable sleeve and is removably connected by fastening means to the driver. This locking member 44, or hub, will preferably have a tapered, or frustoconical portion 48 which will engage with the surface of a complementarily tapered or frustoconical cavity 36 in the expandable sleeve. The locking member has retaining means for limiting its movement in the expandable sleeve. The retaining means includes a stop 42, such as a radial flange or pin, mounted on the locking member 44 so that it engages the longitudinal slot 40 in the expandable sleeve 34. In the preferred embodiment the flange extends longitudinally to fit securely within the longitudinal slot of the sleeve. If desired, a second stop (not shown), such as a pin, may also be mounted on the locking member, which would fit into a second, shorter, longitudinal slot in the sleeve.

Fastening means connects the locking member to the driver. Preferably, the locking member 44 has a longitudinal bore 50 for receiving a fastening member 30 secured to the driver 20. The fastening member is removably anchored proximate the end of the locking member by securement means. Where the fastener is a bolt with a threaded end portion, securement of the bolt can be accomplished by the placement of a securement member, such as an embedded nut 52, ring or other internally threaded member placed on the farthest end of the locking member proximate the opening of the bore, on the threaded end of the fastening member. Alternatively, a portion of the bore 50 may have internal threads to match the external threads of the fastening member.

As mentioned, fastening means, secured to the driver 20, are connected to the locking member 44. The fastening means comprises a fastening member 30 projecting through the expandable sleeve 34 and connected to the driver 20. The fastening member preferably has external threads 54 on one end. The fastener is disposed longitudinally through the recess 36 in the sleeve and is secured on one end to the driver 20 and on its other end by securement means disposed in the opposite end portion of the sleeve. In the preferred embodiment, the fastening member is a bolt 30 which is disposed in the bore 28 in the driver 20; this bore has a diameter sufficient to allow sliding motion of the bolt through the driver. The head 56 of the bolt may be secured to the inner portion of the driver, such as in a stepped recess 32 in the driver which is shaped to hold the head. The end portion 58 of the bolt 30 projects outwardly from the driver 20, having threads 54 on a portion of its external surface to engage complementary internal threads in the bore 50 of the locking member 44 or of an embedded nut 52 or other retaining member placed at the end of the bore to receive the fastener.

It can be seen that the orientation of the bolt could also be reversed: a hex nut 52 could be placed in the recess 32 to receive the threaded end 58 of the bolt and the head 56 of the bolt could be placed in the recess of locking member 44.

Thus, the bolt 30, or other fastener, secures the driver 20 to the locking member 44 which is disposed in the expandable sleeve 34 and held in place in the sleeve by retaining means 42. When the sections of the telescopic pole 12 are in a collapsed state the expandable sleeve 34 is frictionally engaged to the interior surface of its tube 18 and the bolt 30 is relatively slightly engaged with the locking member 44 or the nut placed therein. A section 16 may be slid out when desired and the fastening member will secure the parts of the clamp, and accordingly, the tubes together. As soon as the tube is rotated in the proper direction, the driver will rotate and the threaded end of the bolt will be threaded inwardly into the locking member where it will be tightly secured by a threaded element. The tapered portion 24 of the driver 20 will be moved inwardly against the tapered internal surface 36 of the sleeve 34, causing the sleeve to move radially outwardly to grip the interior surface of the tubular member 18, until the sleeve has expanded to create a tight wedge. Since the fastener firmly connects the driver and the locking member, which is secured in the expandable sleeve of the clamping device, together, and the sleeve, when expanded, tightly and uniformly wedges itself against the inside of the tubular pole, both poles can be locked so tightly together that they cannot inadvertently or gradually become released, but must be deliberately untightened.

In this embodiment it is also desirable for the driver 20 and/or the locking member 44 to have a narrow cylindrical spacer 27 or 47 at the end of the frustoconical portion. Such spacer(s) fit into the inner cylindrical recess 38 in the expandable sleeve and operate to restrict excess inner movement by either the driver or the locking member into the sleeve, thereby avoiding overtightening and damage to the pole or clamp.

In another embodiment of the invention shown in FIGS. 6 and 7, the expandable sleeve 34 has a recess 36 to receive the tapered portion 24 of the driver 20. The expandable sleeve also has a portion with a longitudinal bore 60 to support the fastening member 30. In this embodiment, a tube engaging or locking member 62 is disposed on the end of the sleeve to hold the sleeve inside the tubular member. The tube engaging member may have internal threads to receive the external threads 54 disposed on the fastening member, or the bore in the expandable sleeve may be internally threaded to do so, as shown in FIG. 6. The interior surface of the recess in the expandable sleeve may be tapered to match the surface of the driver. The exterior surface 35 of the sleeve is generally cylindrical; a portion of its inner end 37 is stepped for receiving the tube engaging member thereon. The sleeve may also have longitudinal interior grooves 46.

In this embodiment the tube engaging member 62 has a cylindrical exterior surface and an inner surface to fit onto the projecting portion, of the sleeve 34. The tube engaging member has an axis of rotation which is eccentric to the axis of rotation of the expandable sleeve so that a slight turn of the tubular members will cause the tube engaging member to engage the inner wall of the tube and continued rotation of the tubular sections in one direction will cause the sleeve to expand and lock the poles together as described above for the other embodiment of the invention.

The parts of this invention can be made from a variety of materials, but a rigid plastic is preferred for the driver, the sleeve and the hub. Although special fasteners can be used, a stock brass bolt and hex nut are preferred. The sizes of the parts can vary to conform to the inner diameters of the tubular members which will be joined. Although the interior clamping device 10 of this invention is used particularly advantageously with the sections of telescopic extension poles, it can be used with other applications as well, for example, the squeegee or tool could be locked in place on the end of the extension pole with this interior clamping device; tubular framing for displays, etc., as well as the legs of tripods, could be joined with an interior clamp of this design.

Thus, the interior clamp of this invention is versatile, the design of its parts makes their manufacture relatively inexpensive and the clamp is adaptable for a variety of sizes. The clamp is simple to assemble and mount in the sections of extension poles. When the clamp is to be used, it can be easily activated in the field by turning the pole until it gradually locks tightly in place in a controlled manner. Since the interior clamp of this invention has no parts that are outside the tubular members of the extension pole, the exterior surface of the pole is smooth throughout its entire length, thus preventing unnecessary irritation of the user's hand. Moreover, the entire pole remains tightly locked in place throughout all the movement of the user's tool, since the lock cannot be released by a simple twist or knock but requires a controlled gradual turn of the pole in an unlocking direction. At that point the tubular members are released and collapse to the new position desired.

Thus, the interior clamp of this invention provides a stable lock for telescopic extension poles and any other tubular members which need to be temporarily joined axially, and one which can be easily manufactured and used, and also prevents irritation of the user's hand, thereby contributing to the efficiency and safety of a window cleaner. Additionally, the design of this invention prevents inadvertent unlocking of the wedging force and also makes it less likely that the parts will break and fail inside the tube.

It will be seen that the above-described interior clamping device will achieve all the advantages and objects attributed to it, and while it has been described in detail, it is not to be limited to such details except as may be necessitated by the appended claims.

We claim:

1. An interior clamping device adaptable for mounting in the interior of telescopic cylindrical tubular members or the like to secure said tubular members together, said clamping device comprising
   a driver having an inner portion mounted inside one of said tubular members and a tapered portion projecting outwardly therefrom,
   an expandable sleeve having an exterior surface for contacting the interior surface of said other tubular member and an internal surface for engagement with said driver, the interior of said sleeve having a plurality of longitudinal grooves, and
   a fastener disposed longitudinally through a recess n said sleeve, said fastener being secured at its one end to said driver and at its other end by locking means disposed proximate the inner end portion of said sleeve whereby the relative rotation between said driver and said sleeve in one direction causes the tapered portion of said driver to engage the interior surface of said sleeve and said sleeve is moved radially outwardly to wedge against the inner surface of said other tubular member, causing said tubular members to be locked in axial alignment.

2. The interior clamping device of claim 1 wherein one end of said fastener is securely connected to said driver and the other end of said fastener has an externally threaded portion.

3. The interior clamping device of claim 1 wherein said expandable sleeve has an inner locking portion, said inner portion having a longitudinal bore with internal threads to secure the threaded end of said fastener.

4. The interior clamping device of claim 1 wherein a tube engaging member disposed proximate the inner end of said expandable sleeve has internal threads to secure said fastener inside said sleeve.

5. The interior clamping device of claim 2 or 4 wherein a tube engaging member having a cylindrical exterior surface in contact with the inner surface of said second tubular member is mounted to the inner locking end of said expandable sleeve whereby it rotates eccentrically to the axis of rotation of the expandable sleeve.

6. An interior clamping device adaptable for mounting in the interior of cylindrical tubular members or the like to secure said tubular members together, said clamping device comprising
   a driver having an inner portion mounted inside one of said tubular members and a tapered portion projecting outwardly therefrom;
   an expandable sleeve having an external surface frictionally engaged with the interior surface of said other tubular member and a tapered internal surface for engagement with said driver, the interior of said sleeve having a plurality of longitudinal grooves;
   a locking member disposed in said expandable sleeve and having a longitudinal bore therethrough to support a fastening member;
   retaining means to limit the movement of said locking member in said sleeve;
   a fastening member longitudinally disposed through said sleeve, said fastening member being secured to said driver on one end and to said locking member on said other end, one end of said fastening member having a threaded portion; and
   an internally threaded securement member disposed on the threaded end of said fastening member to secure said fastening member to either said driver or to said locking member whereby the relative rotation between said driver and said expandable sleeve in one direction causes inward engagement of the tapered portion of said driver with the tapered portion of said sleeve and said expandable sleeve is moved radially outwardly to wedge against the inner surface of said other tubular member, causing said tubular members to be locked in axial alignment.

7. The interior clamping device of claim 6 wherein at least a portion of the bore of said locking member has internal threads to receive the external threads of said fastening member and secure said fastening member therein.

8. The interior clamping device of claim 6 wherein an internally threaded securement member is disposed in a recess in said locking member to secure said fastening member therein.

9. The interior clamping device of claim 6 wherein the interior cavity of said expandable sleeve has frustoconical portions on each end thereof and said locking member has a frustoconical portion for engagement with the internal surface of said expandable sleeve.

10. An interior clamping device for securing cylindrical telescopic tubular members together comprising
    a driver having an inner portion adapted to be disposed in the inner of said tubular members, said driver having a tapering portion projecting outwardly from said inner tubular member;
    an expandable sleeve adapted to be disposed in said outer tubular member, and to engage the inner surface thereof, said sleeve having an inner surface for engaging the tapered portion of said driver and a plurality of longitudinal grooves disposed on the interior of said sleeve;
    a fastening member projecting through said expandable sleeve and connected to said driver;
    locking means disposed in said outer tubular member removably securing said driver in said sleeve, whereby rotation of said inner tubular member in one direction relative to the outer tubular member will cause the tapered portion of said driver to project against the inner surface of said expandable sleeve and cause said sleeve to move radially outwardly to grip the surface surrounding said sleeve with a nonyielding force sufficient to lock said tubular members in alignment and reverse rotation of said inner tubular member will loosen the grip of said sleeve.

11. The interior clamping device of claim 10 wherein the longitudinal grooves of said expandable sleeve are slotted to the exterior surface of said sleeve for at least an expandable portion of said sleeve.

12. The interior clamping device of claim 10 wherein said locking means comprises a locking member mounted on said fastener and contacting the inner surface of said sleeve, said locking member being retained from rotational movement relative to said sleeve.

13. The interior clamping device of claim 12 wherein said sleeve has a longitudinal slot extending through its entire length and said locking member has a retaining member projecting into said slot.

14. The interior clamping device of claim 10 or 11 wherein one end of said fastening member is threaded and a securement member is threadedly mounted thereon.

15. The interior clamping device of claim 10 or 11 wherein the locking means further comprises a tube engaging member disposed proximate the end of said sleeve, said tube engaging member having a cylindrical exterior surface in contact with the inner surface of said outer tubular member and an axis of rotation eccentric to the axis of rotation of the expandable sleeve.

16. The interior clamping device of claim 15 wherein said tube engaging member is mounted to an inner locking end of said expandable sleeve.

17. An interior clamping device for securing cylindrical telescopic tubular members together comprising
   a driver having an inner portion adapted to be disposed in the inner of said tubular members, said driver having a tapering portion projecting outwardly from said inner tubular member;
   an expandable sleeve adapted to be disposed inside said outer tubular member, and engage the inner surface thereof, said sleeve having an inner surface for engaging the tapered portion of said driver and a plurality of longitudinal slots disposed in the driver-engaging portion of said sleeve, said expandable sleeve also having an inner locking portion;
   a fastening member projecting through said expandable sleeve and connected to said driver;
   locking means disposed in said outer tubular member removably securing said fastening member in said sleeve, said locking means comprising a tube engaging member mounted to the inner locking end of said sleeve, whereby rotation of said inner tubular member in one direction relative to the outer tubular member will cause the tapered portion of said driver to project against the inner surface of said expandable sleeve and cause said sleeve to move radially outwardly to grip the surface surrounding said sleeve with a nonyielding force sufficient to lock said tubular members in axial alignment and reverse rotation of said inner tubular member relative to the outer tubular member will loosen the grip of said sleeve.

* * * * *